Aug. 16, 1949.  F. E. WHEELER ET AL  2,478,958
PRESSURE RELEASE
Filed March 28, 1944
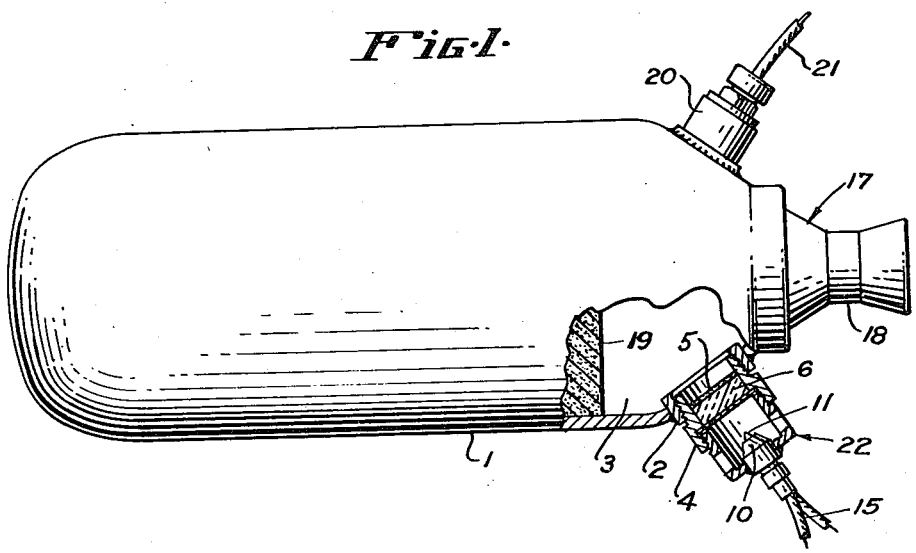
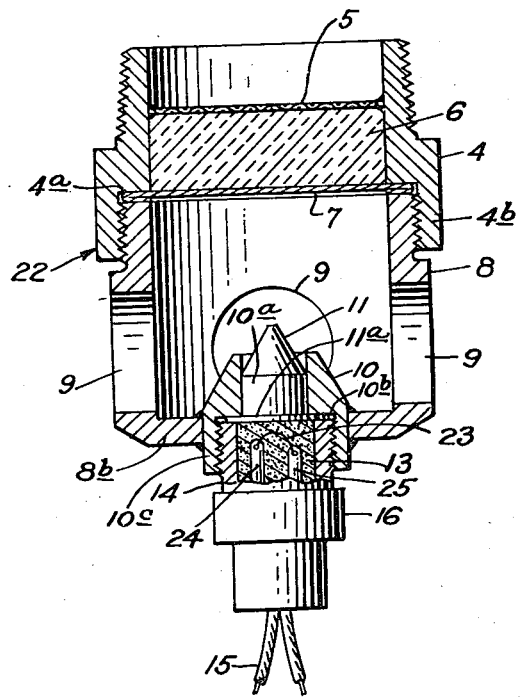
INVENTORS
FRANCIS E. WHEELER
COLMAN ZOLA
BY Christie & Angus
ATTORNEYS Patented Aug. 16, 1949

2,478,958

UNITED STATES PATENT OFFICE 2,478,958

PRESSURE RELEASE

Francis E. Wheeler, Pasadena, and Colman Zola, Los Angeles, Calif., assignors to Aerojet Engineering Corporation, Azusa, Calif., a corporation of Delaware Application March 28, 1944, Serial No. 528,424

2 Claims. (Cl. 220—27)

This invention relates to thrust motors and particularly to thrust motor of the type employing a combustible propellant material in a combustion chamber with an exhaust nozzle through which the gases of combustion are ejected.

The object of this invention is to provide a safety device for relieving the pressure in the chamber when the pressure becomes dangerously high.

A thrust motor commonly comprises a combustion chamber which may be filled or nearly filled with a propellant substance such as a solid material which upon being ignited burns rapidly and produces a large amount of gases. These gases are ejected at high velocity through a constricted exhaust nozzle. As the passageway through the nozzle is relatively small compared to the size of the combustion chamber, high pressures may sometimes build up in the chamber and reach a dangerously high level. Under such conditions it is desirable for the operator to be able immediately to relieve the pressure to prevent explosion.

In accordance with our invention we have provided a safety device capable of relieving dangerously high pressures. The safety device comprises a pellet directed toward a diaphragm or a wall of the chamber which can be pierced by the pellet; and a suitable propelling charge is provided which can be set off when desired to project the pellet through the diaphragm or wall, thereby producing instant relief from the combustion chamber pressure.

A feature of the invention resides in the provision of a flange attached to the pellet and held against the barrel holding the pellet. This and other features will be more fully understood from the following detailed description and the accompanying drawing of which:

Fig. 1 shows a thrust motor provided with a safety device in accordance with this invention, the safety device and part of the motor being shown in section; and Fig. 2 is an enlarged sectional view of the safety device according to this invention.

Referring to Fig. 1 there is shown a thrust motor comprising a combustion chamber 1 which is generally cylindrical in shape and closed at one end. At the other end there is fitted the usual exhaust nozzle 17 having a constricted portion 18. Within the interior 3 of the combustion chamber there is placed a propellant charge 19 which may be composed, for example, of a mixture of asphalt and potassium perchlorate. This is a solid substance which fills the closed end of the chamber, leaving some space between the surface of the charge and the exhaust nozzle. At this space there is attached to the chamber a plug 20 carrying a suitable inflammable charge which may be ignited in any suitable manner, for example, by a nichrome wire which may be heated by sending a current through it from a cable 21. When the current is turned on the heated wire will ignite the fuse or powder, sending a flame from the charge in the plug against the propellant material 19 which ignites it. The exhaust gases from the flame pass out through the nozzle 17 producing the propelling thrust.

The safety device 22 according to our invention comprises a collar 2 which may be welded or otherwise suitably attached within the metal wall of the combustion chamber. This collar is threaded on its inside to receive a hollow nut 4 forming within it a hollow cylinder. The outer portion of the nut is provided with an interior shoulder 4a with a flange 4b provided with an interior thread. A diaphragm 7 of a frangible material, but having substantial strength, for example, of copper, is placed across the cylindrical interior of the nut with its periphery against the shoulder 4a. The diaphragm is held in place against the shoulder by a cap stud 8 which is screwed into the threads of flange 4b. The cap stud 8 is hollow to conform with the hollow interior of nut 4, and the cap stud is provided with a number of ports 9 between the threaded portion of the stud and the head 8b.

For the purpose of protecting the diaphragm 7 from heat from the chamber there is placed against its inner surface a thick layer of a heat resisting material such as fire clay 6, and to hold the fire clay in place a screen 5, for example, steel mesh may be placed over it and welded to the interior of nut 4.

A barrel member 10 is suitably welded in a central location within the head 8b of the port stud. The barrel member is provided with a centrally located cylindrical barrel 10a terminating at its outer portion in a shoulder 10b and having an outer flange 10c protruding through the exterior of the barrel member. There is threaded into the threads of flange 10c a plug 16 having a hollow cylindrical flange portion 14 which is screwed into the flange 10c.

A pellet 11 is placed in the cylindrical barrel 10a and is preferably pointed at its forward end as shown. At its rearward end there is attached to the pellet a cylindrical flange 11a adapted to rest against the shoulder 10b of member 10. The arrangement is such that when plug 16 is screwed into member 10 the forward end of flange 14 holds the flange 11a in position against shoulder 10b. There is placed within the cylindrical portion of flange 14 an explosive charge 13, for example, gunpowder. This may be ignited in a suitable manner, for example, by a nichrome wire 23 carried between terminals 24 and 25 of the electric wires 15.

When the operator wishes to relieve the pressure in the combustion chamber he throws a switch connected with a battery or electrical source (not shown) across the electric wires 15, sending a current through the nichrome wire 23. This explodes the charge 13 causing flange 11a to shear and propels the pellet from barrel 10a through the diaphragm 7 and the substances 6 and 5. This allows the compressed gas from the chamber to rush out through the fractured diaphragm to the atmosphere through ports 9, thereby instantly relieving the pressure in the chamber.

It will be recognized that by our invention we have provided a dependable safety device which can be instantly operated to produce immediate relief of pressure. The device not only is positive in its operation but cannot readily be damaged by the heat of combustion since all operating parts of the device are protected from the heat by a diaphragm 7 and the fire resistant material 6.

We claim:

1. A safety device for relieving pressure in a jet motor chamber, said device comprising a hollow member adapted to be fitted to an aperture through the chamber wall and to communicate with the interior of the chamber, said hollow member having an opening to the atmosphere, a frangible diaphragm within the hollow member and extending across the hollow member at the side of said opening nearest the chamber, thereby separating the interior of the chamber from the opening, a screen-like member spaced from the diaphragm and located between the diaphragm and the interior of the chamber, said screen-like member being affixed to the interior wall of the hollow member, the space between the screen and the diaphragm containing a refractory material, a closure member extending across the hollow member at the side of said opening remote from the chamber, a restricted passageway through said closure member and extending in the direction of the diaphragm, a pellet fitted snugly in the passageway and held therein by a shearable cylindrical flange affixed to the pellet at the side thereof remote from the chamber and engaging the restriction in the passageway, a charge of explosive disposed at the side of the flange remote from the chamber and electrical means for detonating the charge of explosive, whereby detonation of the explosive shears the flange and impels the pellet through the diaphragm.

2. Apparatus according to claim 1 in which the refractory material is fireclay.

FRANCIS E. WHEELER.
COLMAN ZOLA.

REFERENCES CITED

The following references are of record in the file of this patent:

UNITED STATES PATENTS

| Number | Name | Date |
| --- | --- | --- |
| 969,461 | Connor | Sept. 6, 1910 |
| 2,203,626 | Grant | June 4, 1940 |
| 2,262,925 | Cole | Nov. 18, 1941 |
| 2,284,650 | Grant, Jr. | June 2, 1942 |
| 2,400,242 | Malina et al. | May 14, 1946 |